United States Patent
Calcoen

(10) Patent No.: US 10,049,440 B2
(45) Date of Patent: Aug. 14, 2018

(54) OBJECT DETECTION APPARATUS

(71) Applicant: Johan Calcoen, Leuven (BE)

(72) Inventor: Johan Calcoen, Leuven (BE)

(73) Assignee: Key Technology, Inc., Walla Walla, WA (US)

( * ) Notice: Subject to any disclaimer, the term of this patent is extended or adjusted under 35 U.S.C. 154(b) by 368 days.

(21) Appl. No.: 14/981,543

(22) Filed: Dec. 28, 2015

(65) Prior Publication Data

US 2017/0200262 A1    Jul. 13, 2017

(51) Int. Cl.
*H04N 7/18*    (2006.01)
*G06T 7/00*    (2017.01)
*H04N 5/225*    (2006.01)

(52) U.S. Cl.
CPC ......... *G06T 7/0004* (2013.01); *H04N 5/2256* (2013.01); *H04N 7/188* (2013.01); *G06T 2207/30164* (2013.01)

(58) Field of Classification Search
CPC .......... B07C 5/342; B07C 5/365; B07C 5/368
USPC ....................................... 348/131
See application file for complete search history.

(56) References Cited

U.S. PATENT DOCUMENTS

2012/0037545 A1* 2/2012 Van Kasteren ....... B07C 5/3422
                                                             209/577
2015/0375269 A1* 12/2015 Adams .................. B07C 5/3425
                                                             209/577

OTHER PUBLICATIONS

International Search Report and the Written Opinion of the International Searching Authority, dated Jan. 9, 2017.
Notification of Transmittal of International Preliminary Report on Patentability, PCT/US16/59642, dated Jan. 8, 2018.

* cited by examiner

*Primary Examiner* — Frederick D Bailey
*Assistant Examiner* — Masum Billah
(74) *Attorney, Agent, or Firm* — Randall Danskin, PS

(57) ABSTRACT

An object detection apparatus is described and which includes an image capturing device; a source of electromagnetic radiation which is directed towards and reflected from an object passing through a field of view; a background located in spaced relation relative to the image capturing device, and wherein the field of view is located between the image capturing device and the background; and an electromagnetic radiation detector is positioned in electromagnetic receiving relation relative to the background and which is operable to generate a signal which indicates the presence of an object passing through the field of view.

23 Claims, 4 Drawing Sheets

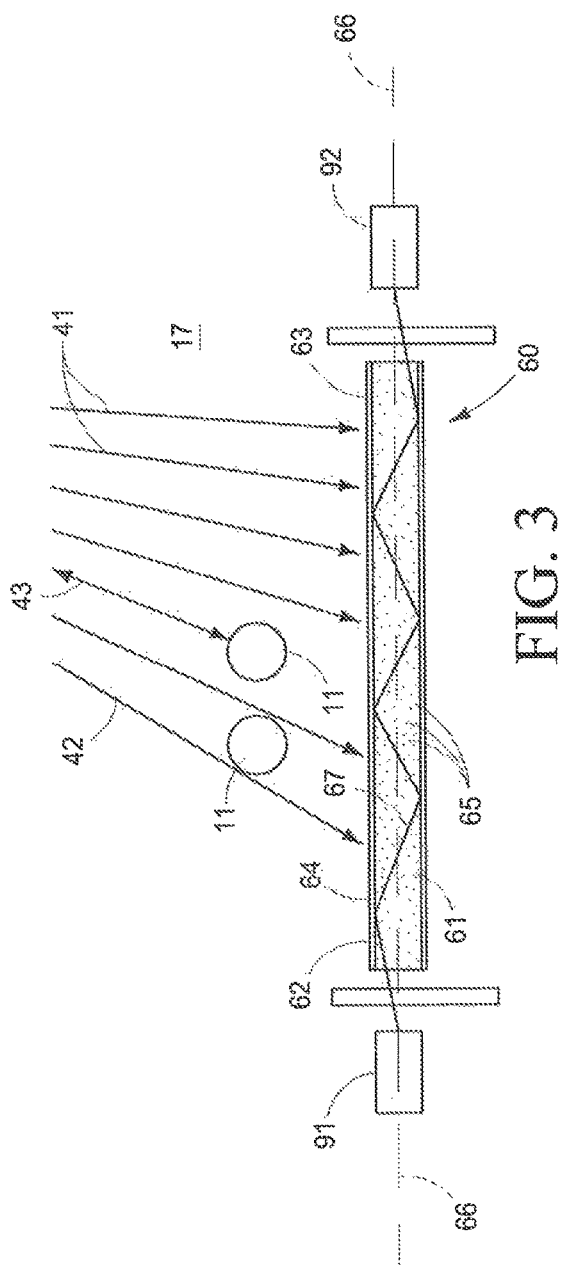
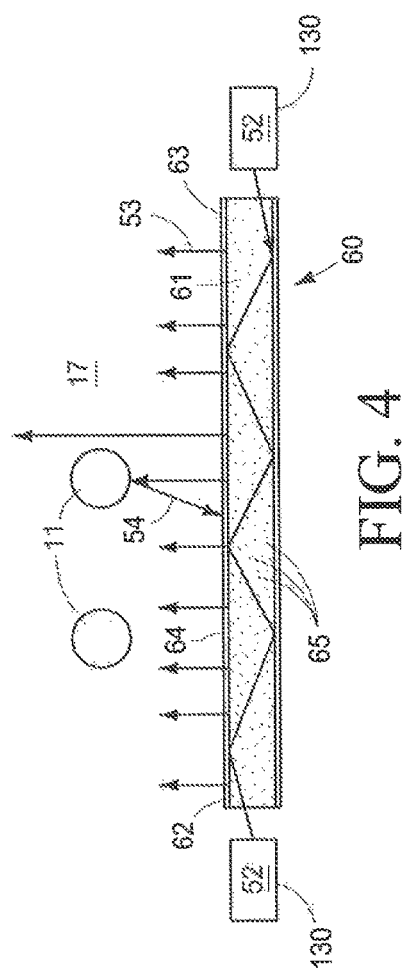

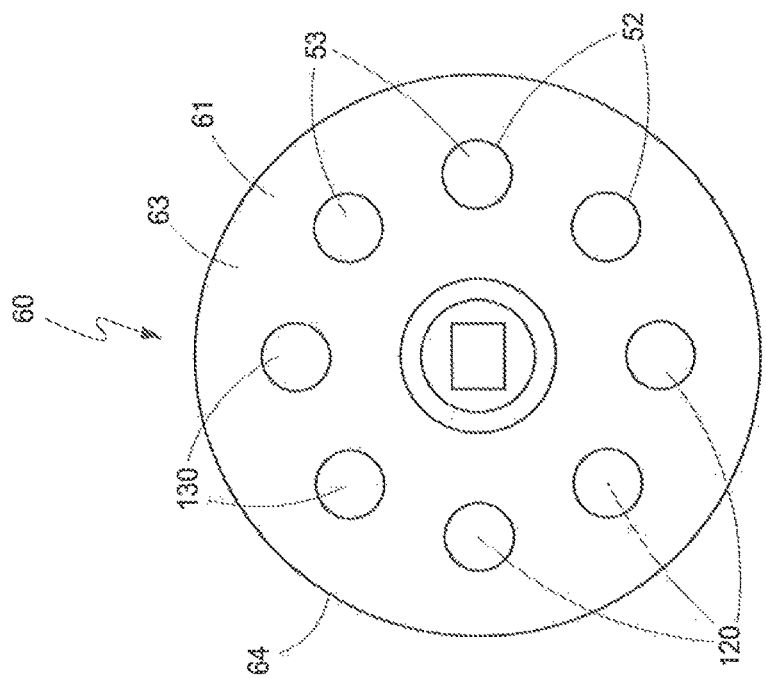
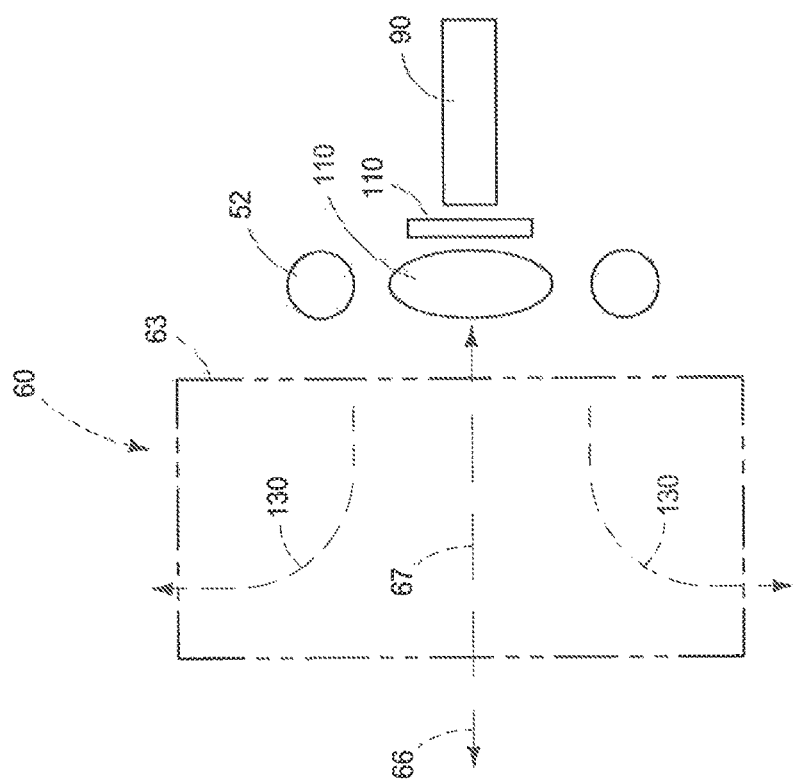

OBJECT DETECTION APPARATUS

TECHNICAL FIELD

The present invention relates to an object detection apparatus, and more specifically to an object detection apparatus which includes a background that both emits and receives electromagnetic radiation, and which further allows for the detection of objects which are being sorted, and which are falling in a product stream, in a manner not possible, heretofore.

BACKGROUND OF THE INVENTION

Various arrangements have been disclosed, and implemented in the last several decades, and which facilitate the imaging of a stream of discrete products in such a fashion that defective or undesirable objects can be visually identified, and thereafter removed from the product stream so as to produce a resulting homogenous end product that can then be further processed for some given end use. The various machine vision applications that have allowed users to image, and then sort defective products have gained widespread usage in assorted industry segments. Further, and as of late, much effort and research has been conducted in the sorting of food products in an effort to further identify contamination, unripe food products, and other agricultural debris which might have become admixed with the stream or product before the processing of the agricultural product has taken place.

While great improvements have been made in various machine vision applications through the years, shortcomings are still attendant with the use of the technology which is currently available. Chief among the shortcomings is that certain debris, or unwanted material, sometimes is not visually identified as the product moves through the sorting process. This may be due to any number of different conditions such as, for example, the debris or other undesirable product is in an improper orientation when imaged; or further the undesired debris or product has the same color as the desired product, or still further, the debris or undesired product adheres to or is otherwise located in such a close relationship or proximity to a desirable product that it cannot be readily visibly discerned during the processing of the product stream.

In any event, food processors, in particular, have strived to remove as much undesirable product, and other debris from a product stream in order to ensure customer safety, and a homogenous product for packaging and shipment. Food processors, for example, further want to ensure that the processing equipment that is employed does not produce excessive "false positives". These "false positives" are acceptable products that have been identified as unacceptable by the sorting system. This, of course, reduces the waste from the product stream, and also ensures that the food processor can receive the maximum available profit from the product stream being processed.

An object detection apparatus which avoids the detriments associated with the prior art practices, which have been utilized, heretofore, is the subject matter of the present application.

SUMMARY OF THE INVENTION

A first aspect of the present invention relates to an object detection apparatus that includes an image capturing device for capturing and forming images of an object which passes through a predetermined field of view; a first source of electromagnetic radiation that is directed towards, and reflected at least in part from, the object which is passing through the field of view, and wherein the image capturing device captures, at least in part, the reflected electromagnetic radiation, and further forms a resulting image of the object passing through the field of view; a background which is located in spaced relation relative to the image capturing device, and wherein the object passing through the predetermined field of view passes between the image capturing device, and the background, and wherein the background receives the source of electromagnetic radiation which has passed through the field of view, and which further has not been reflected by the object, and further re-directs the received electromagnetic radiation along a predetermined path of travel; and an electromagnetic radiation detector which is positioned along the path of travel of the electromagnetic radiation and which has been redirected by the background, and wherein the electromagnetic radiation detector forms an electrical signal in response to the electromagnetic radiation that is received by the background, and detected by the electromagnetic radiation detector, so as to indicate the presence of the object within the field of view of the image capturing device.

More specifically the present invention relates to an object detection apparatus which includes an image capturing device having a field of view, and which further forms an image of an object which passes through the field of view; a first predetermined source of electromagnetic radiation which is generated, directed towards and reflected, at least in part, from the object which passes into the field of view of the image capturing device, and wherein the reflected, first source of electromagnetic radiation is captured, at least in part, by the image capturing device, and which then forms an image of the object passing into the field of view; a second predetermined source of electromagnetic radiation that is directed towards the image capturing device, and wherein the object passing into the field of view of the image capturing device passes through the first and second predetermined sources of electromagnetic radiation, and wherein at least a portion of the second predetermined source of the electromagnetic radiation is received by the image capturing device; a background that is located in spaced relation relative the image capturing device, and wherein the object passing into the field of view of the image capturing device passes between the image capturing device and the background, and wherein the background receives, at least in part, the first predetermined source of electromagnetic radiation, and further directs the first source of electromagnetic radiation along the predetermined path of travel, and wherein the second predetermined source of electromagnetic radiation is delivered to and is transmitted by the background in a direction that extends from the background towards the image capturing device, and wherein the image capturing device captures, at least in part, a portion of the second predetermined source of electromagnetic radiation, and wherein the object passing through the field of view reflects, at least a portion, of the second predetermined source of electromagnetic radiation in a direction back towards the background, and further prevents the reflected second predetermined source of electromagnetic radiation from being received by the image capturing device; an electromagnetic radiation detector mounted in electromagnetic radiation receiving relation relative to the active background, and which is further operable to detect the first and second predetermined sources of electromagnetic radiation that are received by the background; and a controller coupled in controlling relation relative to each of the image capturing device, first and second predetermined sources of electromagnetic radiation, and the electromagnetic radiation detector, and which is further operable to receive the image formed of the object passing through the field of view, and determine the location of the object that is passing through the field of view.

These and other aspects of the present invention will be discussed in greater detail hereinafter.

BRIEF DESCRIPTION OF THE DRAWINGS

FIG. 3 is a greatly simplified, fragmentary, schematic view of still another possible form of the present invention.

FIG. 4 is a simplified, schematic view of another possible form of the present invention.

FIG. 5 is a greatly enlarged, schematic, and simplified view of a feature of the present object detection apparatus.

FIG. 6 is a greatly simplified, enlarged, schematic, end view of a possible arrangement of a background, and which forms a feature of the present invention.

DETAILED DESCRIPTION OF THE PREFERRED EMBODIMENTS

This disclosure of the invention is submitted in furtherance of the constitutional purposes of the U.S. Patent laws "to promote the progress of science and useful arts" [Article I, Section 8].

Figure 1:
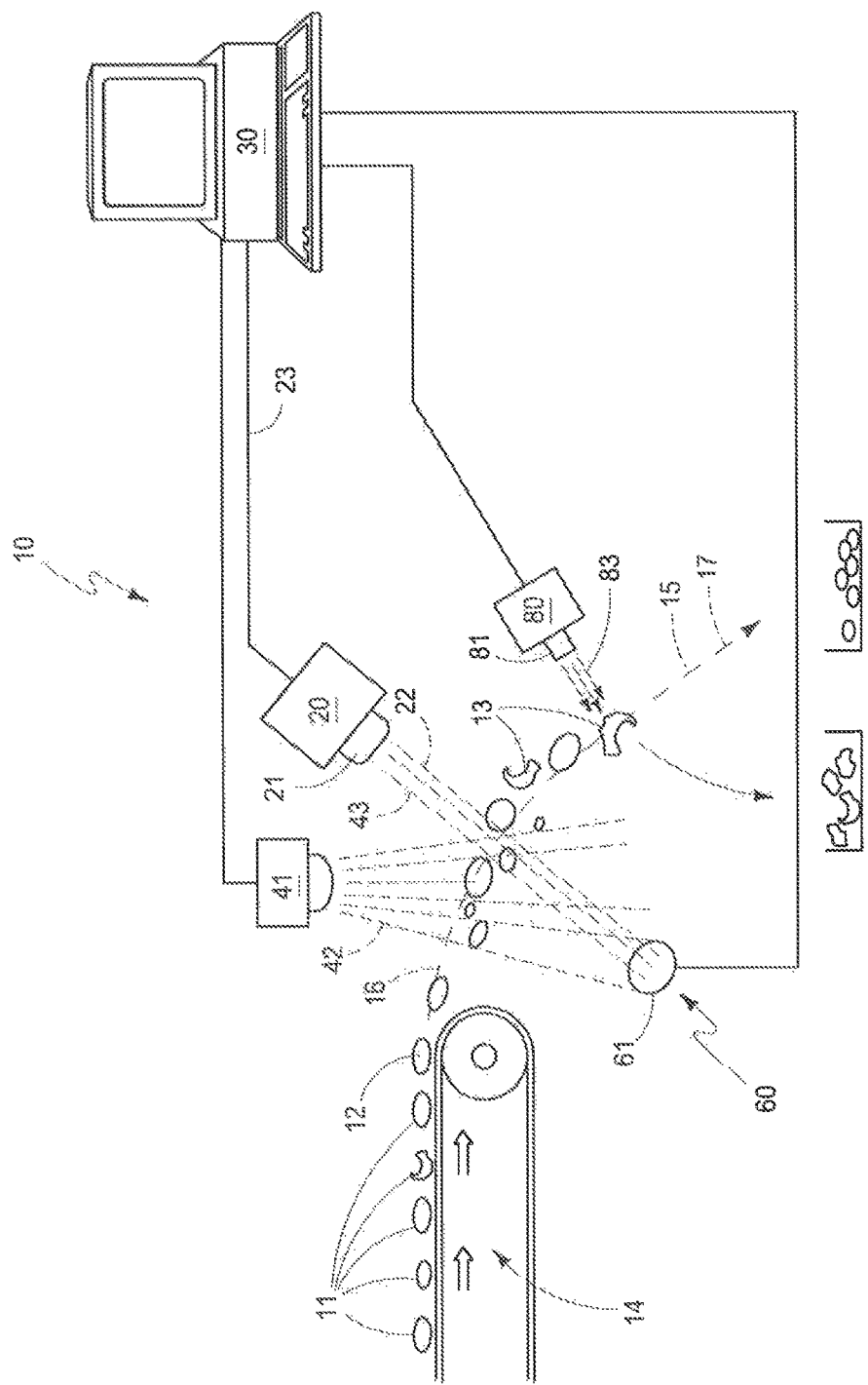
FIG. 1 is a highly simplified, fragmentary, schematic view of an object detection apparatus of the present invention.

Referring now to FIG. 1, a greatly simplified and schematic view of the object detection apparatus of the present invention is seen therein. In this regard, the object detection apparatus is generally indicated by the numeral 10, and is used to image, and then sort, based upon predetermined parameters, a source of discrete objects which are indicated by the numeral 11. The source of objects can include any number of different items, such as discrete food products, or other manufactured objects. It should be understood that the source of the objects 11 includes, both acceptable objects or products 12, and unacceptable objects or products 13. The unacceptable objects or products may include products that do not meet the specified need or requirements of a processor, or on the other hand could constitute some type of contamination. In the case of natural food products, this contamination could include agricultural debris, natural or synthetic materials which are associated with harvesting activities, broken glass, rocks, and any number of other undesirable materials that may have become inadvertently admixed with the source of objects 11. As best seen from a study of FIG. 1, the source of objects to be sorted 11 are supplied or provided to the objection detection apparatus 10 by means of a delivery device 14, and which is here depicted as a continuous conveyor belt which has a top flight that moveably supports the source of objects to be sorted 11. The delivery device 14 may also include other structures such as slides, chutes, and other conventional means for placing the source of objects to be sorted 11 into a continuous stream so that they can be subsequently moved or travel along in a given direction, and then be released into a free-fall path of travel 15. The free-fall path of travel or trajectory 15 has a first-end 16, and which is located adjacent to the delivery device 14, and a remote, second-end 17, and which is located elevationally, below, the delivery device 14, and substantially longitudinally, outwardly, relative to the delivery device 14.

The object detection apparatus 10 of the present invention includes an image capturing device which is generally indicated by the numeral 20. The image capturing device is generally depicted in the drawings as a camera that is used to collect reflected electromagnetic radiation which comes from the direction of the free-fall path of travel 15. Various types of cameras or other image capturing devices may be employed. The image capturing device 20 which is employed may be utilized to collect visually discernable light, or other forms of electromagnetic radiation that may be either visible or invisible. The image capturing device includes a lens 21, or other means for receiving or collecting the transmitted or reflected electromagnetic radiation which is coming from the direction of the field of view 22. It should be understood that the field of view 22 is, at least in part, directed generally transversely, and across the free-fall path of travel 15, and where the source of objects 11 move. When appropriately actuated the image capturing device 20 is operable to transmit an image signal 23 which is received by a controller 30. The controller 30 is then operable, after receiving the image signal 23, to then determine the location of the respective objects, and their individual future trajectories. This controller information is then used for further processing.

As best seen in FIG. 1, and following, a first source of electromagnetic radiation 41 is provided, and which further is directed towards, and is reflected, at least in part, from the objects 11 that are passing through the field of view 22. In this arrangement the image capturing device 20 captures or collects, at least in part, the reflected electromagnetic radiation 43, and further forms a resulting image, and image signal 23 of the objects 11 which are passing through the field of view 22. Still further, and as seen in the drawings (FIG. 4), the object detection apparatus 10 includes a second source of electromagnetic radiation 52, and which is delivered to, and transmitted by a background, as will be discussed, hereinafter, and in a direction that is generally towards the image capturing device 20 (FIG. 2), and wherein the second source of electromagnetic radiation 52 is reflected, at least in part, by the object 11 which is passing through the field of view 22, and further travels back in the direction of the background as will be discussed hereinafter. Any remaining non-reflected electromagnetic radiation 53 which is generated by the second source of electromagnetic radiation 52 is captured, at least in part, by the imaging capturing device 20. The first source of electromagnetic radiation 41 includes electromagnetic radiation which is transmitted 42 towards, and is reflected 43 from the objects 11 which are passing through the field of view 22. Similarly, the second source of electromagnetic radiation 52 has electromagnetic radiation components or portions that are transmitted 53 in the direction of the image capturing device 20, and which are then reflected, 54, from the objects 11 and which are passing through the field of view 22. It should be understood that the first and second sources of electromagnetic radiation 41 and 52, respectively, are otherwise coupled to, and controlled by the controller 30 in the manner which will be discussed, below.

As seen in FIG. 1, and following, the object detection apparatus 10 of the present invention includes a background which is generally indicated by the numeral 60, and which is further located in spaced relation relative to the image capturing device 20. In this spatial arrangement, the objects 11 which are passing through the field of view 22 move between the image capturing device 20, and the background 60. In one form of the invention (FIG. 2), the background 60 receives the source of electromagnetic radiation 41 which has passed through the field of view 22, and which further has not been reflected from the object 11, and further redirects the received electromagnetic radiation 41 along a predetermined path of travel 67 which will be discussed, below. The background 60 comprises an elongated, cylindrically shaped, and translucent bar or main body 61, which has a first end 62, and an opposite, second end 63. Still further, the cylindrically shaped main body 61 is defined, at least in part, by a longitudinal axis 66. The cylindrically shaped main body further has an exterior facing surface 64. The cylindrically shaped main body 61 is made from a polymeric, translucent material which includes suspended nano-sized particles 65 which are operable to reflect or otherwise re-direct, at least a portion of, the second source of an electromagnetic radiation 52 that is traveling along the main body 61 so that at least a portion of the second source of electromagnetic radiation 52 moves, travels or is otherwise transmitted radially, outwardly, relative to the exterior facing surface 64 (FIG. 4). A suitable material for fabrication of the background can be secure under the trademark "Pyrasied Xtreme Acrylic". Therefore, the second source of electromagnetic radiation 52 which is passing between the first and second ends 62 and 63, respectively, is diverted or partially reflected, at least in part, in a manner and where it passes radially, outwardly, and in a substantially perpendicular orientation relative to the longitudinal axis 66, and in a direction towards the image capturing device 20. This particular operational feature of the invention will be discussed in greater detail, below. The cylindrically shaped, and translucent bar which forms the main body 61 of the background 60, as noted, above, is fabricated from a polymeric material, and further has a length dimension of less than about 3 meters, and further has a cross-sectional dimension of less than about 90 mm.

Figure 2:
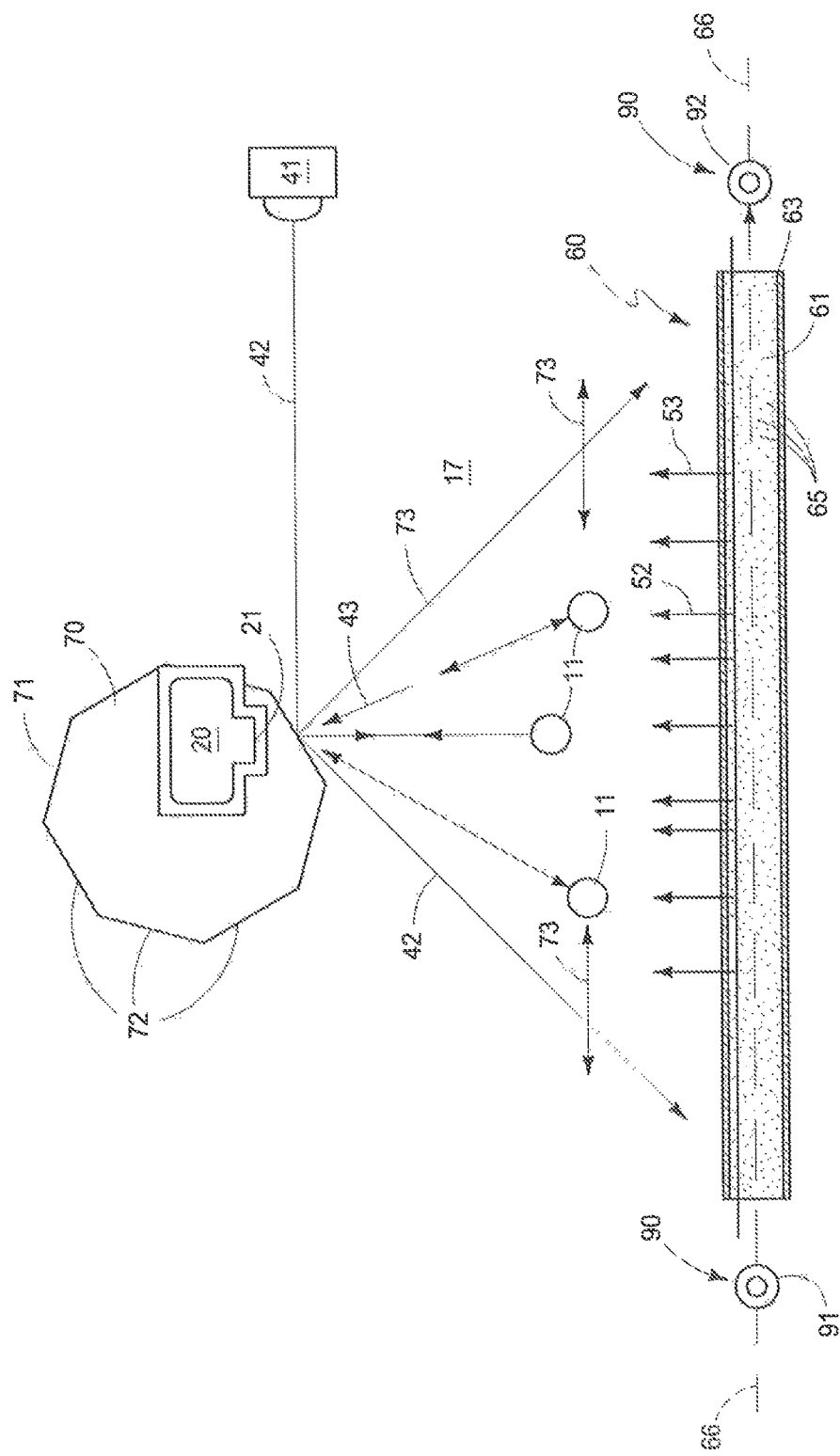
FIG. 2 is greatly simplified, fragmentary, schematic view of one possible form of the present invention.

Referring now to FIG. 2, and in one possible form of the invention, the first source of electromagnetic radiation 40 is generated, and distributed or transmitted as a line scan by means of a rotating polygon of conventional design 70. Rotating polygons which produce a scanning or flying light spot have been widely used for many years. The rotating polygon 70 has an exterior facing surface 71, which defines a multiplicity of reflective facets. The rotation of the polygon produces a scanning illuminated line 73 which moves back and forth across the background 60 in a manner which is well known in the art. As seen in FIG. 2, the image capturing device 20 is positioned either in front of, behind, or beside the rotating polygon, and is operable to collect or receive the reflected electromagnetic radiation 43 which is reflected from the objects 11, or further receives the transmitted electromagnetic radiation 53, which is generated, or provided by the second source of electromagnetic radiation 52.

As seen in FIG. 1, the object detection apparatus 10 of the present invention further includes an ejector 80 which is positioned downstream relative to delivery device 14, and at a location which is near the second end 17 of the free-fall path of travel 15. The ejector 80 is of traditional design, and is further electrically coupled in signal receiving relation relative to the controller 30. The ejector includes a multiplicity of air discharge nozzles which are generally indicated by the numeral 81. The ejector 80 further is supplied with a source of pressurized air (not shown), and which is then selectively discharged as indicated by the number 83, in order to exert force on an unacceptable product 13 which is moving along the free-fall path of travel 15. The pressurized release of air knocks or otherwise exerts force on the undesirable product 13 to move it out of the free-fall path of travel 15. The ejector 80 is selectively actuated by means of the controller 30, after the controller 30 has processed the image signal 23, and has identified one of the objects of 11 as being an unacceptable product 13, and further has calculated the estimated trajectory of the product 13. This removal technique is well known in the art, and a further discussion regarding same is not warranted.

The object detection apparatus 10 of the present invention includes an electromagnetic radiation detector 90, and which is positioned along the path of travel 66 of the electromagnetic radiation 42, 54 as this electromagnetic radiation travels along the background 60. The electromagnetic radiation detector 90 forms an electrical signal when exposed to electromagnetic radiation, 42, 54 so as to indicate the presence of the objects 11, which are within the field of view 22 of the image capturing device 10. As will be seen from a study of FIG. 2, and following, the electromagnetic radiation detector 90 may comprise one or more detectors, which are each operable to detect a predetermined wavelength of electromagnetic radiation that is being received by the background 60. In this regard, the first and second detectors are indicated by the numerals 91 and 92, respectively. Referring now to FIG. 3, an alternative form of the invention 10 is illustrated, and which shows an optical filter that is generally indicated by the numeral 100, and which is positioned therebetween the opposite first and second ends 62 and 63 of the background 60. The optical filter 100 is operable to allow only a given band of electromagnetic radiation that has been received by the background 60 to pass therethrough, and be detected by either the first or second detector 91 and 92, respectively. As best seen by reference to FIG. 5, and in still another form of the invention, it is conceivable that a background 60 may be deployed, and wherein, in addition to the electromagnetic radiation detector 90, an optical filter 100, and an optical lens 110 can be positioned in electromagnetic receiving relation relative to one of the opposite ends 62 and/or 63, and which direct the received electromagnetic radiation through the optical filter 100, and be detected by either the first detector 91, or second detector 92. Referring now to FIG. 6, and in another possible form of the invention, the second source of electromagnetic radiation 52 may be generated by a multiplicity of electromagnetic radiation generators 120. These respective electromagnetic generators 120 can generate electromagnetic radiation of the same frequency, different frequencies, or combinations of frequencies having different bandwidths. Still further, the multiplicity of electromagnetic radiation generators 120 may be energized in unison, or selectively energized in a given pattern so as to produce various lighted backgrounds which will allow the image capturing device 20 to produce a resulting image signal 23 having much more information regarding the individual objects which are being sorted 11. This additional information allows for better sorting decisions to be made by the controller 30. In this arrangement, an enhanced final product may be produced which has fewer contaminants, or other undesirable products contained therein. In the arrangement as seen in FIG. 6, the object detection apparatus 10 includes a third source of electromagnetic radiation 130. This third source of electromagnetic radiation is generated by the multiplicity of electromagnetic generators 120 which is seen in FIG. 6. It should be understood that the third source of electromagnetic radiation is transmitted, at least in part, by the background 60, and in a radially outward direction and towards the image capturing device 20 by the action of the nano-sized particles 65 which are located within the background 60.

OPERATION

The operation of the described embodiment of the present invention is believed to be readily apparent, and is briefly summarized at this point. In its broadest aspect the present invention relates to an object detection apparatus 10 which includes an image capturing device 20 for capturing and forming images of an object 11 which passes through a predetermined field of view 22. In the arrangement as seen in the drawings a first source of electromagnetic radiation 41, is provided and which is directed towards 42, and reflected 43, at least in part from the objects 11 which are passing through the field of view 22. The image capturing device 20 captures, at least in part, the reflected electromagnetic radiation 43, and further forms a resulting image 23 of the objects 11 which are passing through the field of view 22. The object detection apparatus 10 further includes a background 60 which is located in spaced relation relative to image capturing device 20. The objects 11 which are passing through the predetermined field of view 22, pass between the image capturing device 20, and the background 60. The background 60 receives the source of electromagnetic radiation 41 which has passed through the field of view 22, and which further has not been reflected by the respective objects 11. The background 60 further redirects the received electromagnetic radiation 41, 54 along a predetermined path of travel 67. The object detection apparatus further includes an electromagnetic radiation detector 90 which is positioned endwardly, and along the path of travel 67 of the redirected electromagnetic radiation 41. As earlier noted, the electromagnetic radiation which has been received by the background 60 is redirected by the background 60 along the path of travel 67. The electromagnetic radiation detector 90 which is positioned endwardly of the respective background 60 receives the redirected electromagnetic radiation, and then forms an electrical signal in response to the electromagnetic radiation 41, 54 and which is received by the background 60. The electromagnetic radiation detector 90, in combination with the controller 30, are then functional, in combination, to indicate the presence of the respective objects 11 within the field of view 22 of the image capturing device 20. As earlier noted, the electromagnetic radiation detector 90 is operably coupled with a controller 30. Further, the controller 30 is then coupled in controlling relation relative to the first and second sources of electromagnetic radiation 41 and 42; the image capturing device 20, and further is controllably coupled to the ejector 80 to render the object detection apparatus capable of identifying defective or unacceptable objects 13, and thereafter removing them from the product stream 15 by sending suitable control signals to the ejector 80.

As earlier noted, the first, second and third sources of electromagnetic radiation 41, 52 and 130 respectively may generate either visible and/or invisible light. Still further, these same sources of electromagnetic radiation may have the same or different wavelengths of electromagnetic radiation. Still further, the multiple sources of electromagnetic radiation may be energized substantially simultaneously, sequentially timed, or otherwise energized in a given pattern by means of the controller 30 so as allow the controller 30 to generate increasing amounts of information with regard to the nature of the individual products being inspected, and further identify defective products or contamination 13 which would, heretofore gone undetected. This invention further allows a user to sort a stream of discrete products, as to product grade. This feature, of course, allows the user to increase their profitability from sorting operations.

Therefore, it will be seen that the present object detection apparatus 10 provides a convenient means whereby defective products and/or contamination 13 which is admixed within an object or product stream 11 can be sorted with a high degree of efficiency. The object detection apparatus, when rendered operational, can use multiple different sources of electromagnetic radiation which can be directed towards the objects and then can be captured by an image receiving device 20. Thereafter, a controller 30 could then discern, in a better manner, the type of objects in the stream, and then can make intelligent decisions regarding removing defective or undesirable objects or products 13 from a falling product stream 15 by means of traditional ejection methodology 80.

In compliance with the statute, the invention has been described in language more or less specific as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents,

I claim:

1. A background for an object detection apparatus, comprising:
    an image capturing device for capturing and forming images of an object which passes through a predetermined field of view;
    a first source of electromagnetic radiation that irradiates the predetermined field of view through which the object of interest passes, and which is directed towards, and reflected at least in part from, the object which is passing through the predetermined field of view, and wherein the image capturing device captures, at least in part, the reflected first electromagnetic radiation, and further forms a resulting image of the object passing through the predetermined field of view;
    a second source of electromagnetic radiation;
    the background comprises an elongated, cylindrically shaped translucent bar which has opposite first and second ends, and an outside facing surface and is defined, at least in part, by a longitudinal axis which extends between the first and second ends thereof, and the cylindrically shaped bar is fabricated from a translucent substrate containing a plurality of suspended nano sized particles, and wherein the background is located in spaced relation relative to the image capturing device and the first source of electromagnetic radiation, so that the object passing through the predetermined field of view passes between the image capturing device, and the background; and
    an electromagnetic radiation detector communicating with one end of the background so as to detect the first source of electromagnetic radiation which has been received by the background, and that has passed through the predetermined field of view, and not been reflected by the object of interest which is passing through the predetermined field of view, and at least a portion of the received first source of electromagnetic radiation is passed along the longitudinal axis of the background to the electromagnetic radiation detector, and wherein the second source of electromagnetic radiation communicates with one end of the background, so as to emit electromagnetic radiation that passes along the longitudinal axis of the background, and at least a portion of the emitted second source of electromagnetic radiation is optically diverted by the suspended nano sized particles, so as to pass radially outwardly of the background into the predetermined field of view, and towards the image capturing device.

2. A background for an object detection apparatus as claimed in claim 1, and wherein the second source of electromagnetic radiation which is delivered to, and then transmitted by, the background in a direction which is generally towards the image capturing device, and wherein the second source of electromagnetic radiation is reflected, at least in part, by the object passing through the predetermined field of view, and wherein the reflected, second source of electromagnetic radiation travels back in the direction of the background, and any remaining non-reflected electromagnetic radiation from the second source of electromagnetic radiation is captured, at least in part, by the image capturing device.

3. A background for an object detection apparatus as claimed in claim 2, and further comprising:
   a controller which is coupled in controlling relation relative to each of the image capturing device, the first and second sources of electromagnetic radiation, and the electromagnetic radiation detector, and which further is operable to receive the image formed by the image capturing device of the object passing through the predetermined field of view, and then determine the location of the object which is passing through the predetermined field of view.

4. A background for an object detection apparatus as claimed in claim 3, and further comprising:
   a device for selectively projecting the first source of electromagnetic radiation into the predetermined field of view, and repeatedly scanning the first source of electromagnetic radiation along a predetermined line which extends through the predetermined field of view.

5. A background for an object detection apparatus as claimed in claim 4, and wherein the predetermined, scanned line of the first source of electromagnetic radiation is directed along the background, and between the first and second ends thereof, and wherein the electromagnetic radiation detector is located adjacent to the first end of the background, and the second source of electromagnetic radiation is delivered to the second end of the background.

6. A background for an object detection apparatus as claimed in claim 5, and wherein the elongated, cylindrically shaped, and translucent bar which forms the background, and which has opposite first and second ends is defined, at least in part, by a longitudinal axis which extends between the first and second ends thereof, and wherein the cylindrically shaped, and translucent bar is fabricated from a translucent substrate which passes the second source of the electromagnetic radiation, at least in part, along the longitudinal axis thereof, and further diverts a portion of the second source of electromagnetic radiation passing between the first and second ends thereof, so that a portion of the second source of electromagnetic radiation passes in a radially, outward direction relative to the longitudinal axis of the cylindrically shaped, and translucent bar, and in the direction of the image capturing device.

7. A background for an object detection apparatus as claimed in claim 6, and wherein the cylindrically shaped, and translucent bar is fabricated from a synthetic polymeric material, and further has a length dimension of less than about 3 meters and a cross-sectional dimension of less than about 90 mm.

8. A background for an object detection apparatus as claimed in claim 7, and wherein the first and second sources of electromagnetic radiation are visible and/or invisible.

9. A background for an object detection apparatus as claimed in claim 8, and wherein the first and second sources of electromagnetic radiation have different wavelengths.

10. A background for an object detection apparatus as claimed in claim 9, and wherein the repeated scanning of the first source of electromagnetic radiation is sequentially timed, and the controller determines the location of the object passing through the predetermined field of view by employing the timed scanning of the first source of electromagnetic radiation.

11. A background for an object detection apparatus as claimed in claim 10, and further comprising:
    a third source of electromagnetic radiation which is generated, and delivered to the first end of the background, and which is further transmitted by the background in a radially outward direction and towards the image capturing device.

12. A background for an object detection apparatus as claimed in claim 11, and further comprising:
    an optical filter which is located in an operable orientation between the first end of the background, and the electromagnetic radiation detector, and wherein the optical filter substantially prevents the electromagnetic radiation detector from receiving the second source of the electromagnetic radiation.

13. A background for an object detection apparatus, comprising:
    an image capturing device having a field of view, and which further forms an image of an object which passes into the field of view;
    a first predetermined source of electromagnetic radiation which is generated, directed towards, and reflected at least in part from the object which passes into the field of view of the image capturing device, and wherein the reflected, first source of electromagnetic radiation is captured, at least in part, by the image capturing device, and which then forms an image of the object passing into the field of view;
    a second predetermined source of electromagnetic radiation which is directed towards the image capturing device, and wherein the object passing into the field of view of the image capturing device passes through the first and second predetermined sources of electromagnetic radiation, and wherein at least a portion of the second predetermined source of electromagnetic radiation is received by the image capturing device;
    a background which is located in spaced relation relative to the image capturing device, and wherein the object passing into the field of view of the image capturing device passes between the image capturing device, and the background, and wherein the background receives, at least in part, the first predetermined source of electromagnetic radiation, and further directs the first source of electromagnetic radiation along a predetermined path of travel, and wherein the second predetermined source of electromagnetic radiation is delivered to, and is transmitted by the background in a direction which extends from the background towards the image capturing device, and wherein the image capturing device captures, at least in part, a portion of the second predetermined source of electromagnetic radiation, and wherein the object passing through the field of view reflects at least a portion of the second predetermined source of electromagnetic radiation in a direction back towards the background, and further prevents the reflected second predetermined source of electromagnetic radiation from being received by the image capturing device, and the background is an elongated, cylindrically shaped translucent bar which has opposite first and second ends, and an outside facing surface and is defined, at least in part, by a longitudinal axis which extends between the first and second ends thereof, and the cylindrically shaped bar is fabricated from a translucent substrate containing a plurality of suspended nano sized particles;

an electromagnetic radiation detector mounted in electromagnetic radiation receiving relation relative to the background, and which is further operable to detect the first and second predetermined sources of electromagnetic radiation which are received by the background; and a controller coupled in controlling relation relative to each of the image capturing device, the first and second predetermined sources of electromagnetic radiation, and the electromagnetic radiation detector, and which is further operable to receive the image formed of the object passing through the field of view, and determine the location of the object which is passing through the field of view.

14. A background for an object detection apparatus as claimed in claim 13, and further comprising:
a device for selectively projecting the first source of electromagnetic radiation into the predetermined field of view of the image capturing device, and repeatedly scanning the first mentioned source of electromagnetic radiation along a predetermined line which extends through the field of view.

15. A background for an object detection apparatus as claimed in claim 14, and wherein the predetermined, scanned line of the first source of the electromagnetic radiation is directed along the background, and between the first and second ends thereof, and wherein the electromagnetic radiation detector is located adjacent to the first end of the background, and the second source of electromagnetic radiation is delivered to the second end of the background.

16. A background for an object detection apparatus as claimed in claim 15, and wherein the elongated, cylindrically shaped, and translucent bar which forms the background, and which has opposite first and second ends is defined, at least in part, by a longitudinal axis which extends between the first and second ends thereof, and wherein the cylindrically shaped, and translucent bar is fabricated from a translucent substrate which passes the second source of the electromagnetic radiation, at least in part, along the longitudinal axis thereof, and further diverts a portion of the second source of electromagnetic radiation passing between the first and second ends thereof so that a portion of the second source of electromagnetic radiation passes in a radially outward direction relative to the longitudinal axis of the cylindrically shaped, and translucent bar, and in the direction of the image capturing device.

17. A background for an object detection apparatus as claimed in claim 16, and wherein the cylindrically shaped, and translucent bar is fabricated from a synthetic polymeric material, and further has a length dimension of less than about 3 meters, and a cross-sectional dimension of less than about 90 mm.

18. A background for an object detection apparatus as claimed in claim 17, and wherein the first and second sources of electromagnetic radiation are visible and/or invisible.

19. A background for an object detection apparatus as claimed in claim 18, and wherein the first and second sources of electromagnetic radiation have different wavelengths.

20. A background for an object detection apparatus as claimed in claim 19, and wherein the repeated scanning of the first source of electromagnetic radiation is sequentially timed, and the controller determines the location of the object passing through the field of view by employing the timed scanning of the first source of electromagnetic radiation.

21. A background for an object detection apparatus as claimed in claim 20, and further comprising:
a third source of electromagnetic radiation which is generated, and delivered to the first end of the background, and which is further transmitted by the background in a radially outward direction and towards the image capturing device.

22. A background for an object detection apparatus as claimed in claim 11, and further comprising:
an optical filter which is located in an operable orientation between the first end of the background, and the electromagnetic radiation detector, and wherein the optical filter substantially prevents the electromagnetic radiation detector from receiving the second source of the electromagnetic radiation.

23. A background for an object detection apparatus having an image capturing device, a first source of electromagnetic radiation that irradiates a predetermined field of view through which objects of interest pass, and a second source of electromagnetic radiation, the background comprising:
an elongated, cylindrically shaped translucent bar which has opposite first and second ends, and an outside facing surface and is defined, at least in part, by a longitudinal axis which extends between the first and second ends thereof, and the cylindrically shaped bar is fabricated from a translucent substrate containing a plurality of suspended nano sized particles, and wherein the background is located in spaced relation relative to the image capturing device and the first source of electromagnetic radiation, so that the objects passing through the irradiated predetermined field of view pass between the image capturing device, and the background;
an electromagnetic radiation detector communicating with one end of the background so as to detect the first source of electromagnetic radiation which has been received by the background, and that has passed through the irradiated predetermined field of view, and not been reflected by the objects of interest which are passing through the irradiated predetermined field of view, and at least a portion of the received first source of electromagnetic radiation is passed along the longitudinal axis of the background to the electromagnetic radiation detector, and wherein the second source of electromagnetic radiation communicates with one end of the background so as to emit electromagnetic radiation which passes along the longitudinal axis of the background, and at least a portion of the emitted second source of electromagnetic radiation is optically diverted by the suspended nano sized particles, so as to pass radially outwardly of the background into the predetermined field of view, and towards the image capturing device.

* * * * *